United States Patent Office 3,753,859
Patented Aug. 21, 1973

3,753,859
MICROBIOLOGICAL PROCESS FOR PREPARING THE AMINO ACIDS TRANS-4-n PROPYL-L-PROLINE AND TRANS-4-ETHYL-L-PROLINE
Bruce W. Churchill, Kalamazoo, Brenda J. Rakow, Portage, and Malcolm E. Bergy, Kalamazoo, Mich., assignors to The Upjohn Company, Kalamazoo, Mich.
No Drawing. Filed Jan. 24, 1972, Ser. No. 220,389
Int. Cl. C12d 1/02
U.S. Cl. 195—47                                7 Claims

ABSTRACT OF THE DISCLOSURE

A microbiological process for preparing the amino acids trans-4-n propyl-L-proline and trans-4-ethyl-L-proline which are useful as intermediates for the preparation of antimicrobially active lincomycin antibiotics. Further, trans-4-n propyl-L-proline is useful to inhibit the production of lincomycin B in a lincomycin fermentation.

BACKGROUND OF THE INVENTION

Lincomycin is an antibiotic producible by a fermentation process using the micoorganism *Streptomyces lincolnensis* var. *lincolnensis*. In U.S. Pat. 3,086,912 there is described a fermentation and recovery process for the production of lincomycin, formerly known as lincolnensin. Lincomycin B, a nitrogenous base having the molecular formula $C_{17}H_{32}N_2O_6S$, is concomitantly produced in the lincomycin fermentation. U.S. Pat. 3,359,164 discloses the recovery of lincomycin B from lincomycin fermentations, such as described in U.S. Pat. 3,086,912. Though lincomycin and lincomycin B have activity against essentially the same spectrum of microorganisms, it is known that lincomycin B is significantly less active against said microorganisms than is lincomycin. Accordingly, lincomycin is the preferred antibiotic.

It is also known, as disclosed in U.S. patent application Ser. No. 67,966, filed Aug. 28, 1970, that the use of an effective amount of the amino acid propyl proline in a lincomycin fermentation medium, such as disclosed in U.S. Pat. 3,086,912, reduces the level of lincomycin B present in the fermentation beer. This reduction of lincomycin B in the fermentation beer facilitates the recovery of lincomycin which then leads to higher recovery yields of lincomycin from said beers.

BRIEF SUMMARY OF THE INVENTION

The process of the subject invention comprises the use of a novel mutant strain of *Streptomyces lincolnensis* var. *lincolnensis* in a controlled fermentation to produce predominantly trans-4-n propyl-L-proline (also known as propyl proline), along with small amounts (7–9% of total prolines) of trans-4-ethyl-L-proline. These amino acids are useful as intermediates as disclosed in U.S. Pat. 3,380,992 to make antimicrobially-active lincomycin analogues.

DETAILED DESCRIPTION OF THE INVENTION

The novel actinomycete used according to this invention for the production of trans-4-n propyl-L-proline and trans-4-ethyl-L-proline is *Streptomyces lincolnensis* strain BAB-3. One of its strain characteristics is the production of these amino acids. A subculture of this living organism can be obtained upon request from the permanent collection of the Northern Utilization and Research Division, Agricultural Research Services, U.S. Department of Agriculture, Peoria, Ill., U.S.A. Its accession number in this repository is NRRL 5321.

The microorganism of this invention was studied and characterized by Alma Dietz of The Upjohn Research Laboratory.

DESCRIPTION OF THE MICOORGANISM

*Streptomyces lincolnensis* strain BAB-3 was compared with parent culture *Streptomyces lincolnensis* var. *lincolnensis*, NRRL 2936.

Both cultures have cream to pink to gray aerial growth, are melanin positive, and have long straight sporophores bearing rectangular smooth spores with basket-weave surface detail.

The cultures showed the same pattern for assimilation of carbon compounds as was given in Mason et al. [Mason, D. J., A. Dietz, and C. DeBoer. 1962. Lincomycin, A New Antibiotic. I. Discovery and Biological Properties. Antimicrobial Agents and Chemotherapy—1962, pp. 554–559]. The parent culture had a brown reverse on the synthetic medium with D-fructose, D-glucose, sucrose, lactose, raffinose, inulin and glycerol; the mutant did not.

In the synthetic medium cited in Shirling and Gottlieb [Shirling, E. B., and D. Gottlieb. 1966. Methods for Characterization of Streptomyces Species. Int. J. System. Bacteriol. 16: 313–340] both cultures grew slightly on the negative control (no carbon compound added) and well on the D-glucose control. Growth was strong on the synthetic medium with L-arabinose, sucrose, D-xylose, inositol, and raffinose; good on D-mannitol, D-fructose, and rhamnose; and doubtful on cellulose. The cultures differed in the color of their growth on some of these carbon compounds as is noted in Table I.

*Streptomyces lincolnensis* var. *lincolnensis*, NRRL 2936, produces the antibiotic lincomycin; the mutant culture *Streptomyces lincolnensis* strain BAB-3 produces trans-4-n propyl-L-proline and trans-4-ethyl-L-proline.

The characteristics of *Streptomyces lincolnensis* BAB-3, NRRL 5321, are given in the following table:

TABLE I.—GROWTH DIFFERENCES OF *S. LINCOLNENSIS* CULTURES ON SOME CARBON COMPOUNDS IN SYNTHETIC MEDIUM [1]

| Carbon compound | *S. lincolnensis*, BAB-3 | *S. lincolnensis* var. *lincolnensis*, NRRL 2936 |
|---|---|---|
| D-glucose | Pink aerial growth. Tan reverse. | Green-gray vegetative growth. Melanin-positive |
| Sucrose | Yellow reverse. No pigment. | Tan brown reverse. Melanin-positive. |
| D-mannitol | Pink aerial growth. No pigment. | Green-gray vegetative growth. |
| D-fructose | do | Green-gray vegetative growth. Melanin-positive |
| Rhamnose | do | Do. |
| Raffinose | No pigment | Melanin-positive. |

[1] Shirling, E. B., and D. Gottlieb. 1966. Methods for Characterization of Streptomyces Species. Int. J. System. Bacteriol. 16:313–340.

Trans-4-n propyl-L-proline and trans-4-ethyl-L-proline are produced by the novel microorganism of the subject invention when said microorganism is grown in an aqueous nutrient medium under submerged aerobic conditions. It is to be understood also that for the preparation of limited amounts, surface cultures, e.g. bottles, can be employed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, cornstarch, lactose, dextrin, molasses, and the like. Preferred nitrogen sources include corn steep liquor, yeast, autolyzed brewer's yeast with milk solids, soybean meal, cottonseed meal, cornmeal, milk solids, pancreatic digest of casein, distillers' solids, animal peptone liquors, meat and bone scraps, and the like. Combinations of these carbon and nitrogen sources can be used advantageously. Trace metals, for example, zinc, magnesium, manganese, cobalt, iron, and the like, usually need not be added to the fermentation media since tap water and unpurified ingredients are used as media components.

Production of trans-4-n propyl-L-proline and trans-4-ethyl-L-proline by the process of the invention can be effected at any temperature conducive to satisfactory growth of the novel microorganism, for example, between about 18° and 40° C., and preferably between about 20° and 32° C. Ordinarily, optimum production of trans-4-n propyl-L-proline and trans-4-ethyl-L-proline is obtained in about 2 to 11 days. The medium may remain basic or become acidic during the fermentation. The final pH is dependent, in part, on the buffers present, if any, and in part on the initial pH of the culture medium.

When growth is carried out in large vessels and tanks, it is preferable to use the vegetative form, rather than the spore form of the microorganism for inoculation to avoid a pronounced lag in the production of trans-4-n propyl-L-proline and trans-4-ethyl-L-proline and the attendant inefficient utilization of the equipment. Accordingly, it is desirable to produce a vegetative inoculum in a nutrient broth culture by inoculating this broth culture with an aliquot from a soil or a slant culture. When a young active vegetative inoculum has thus been secured, it is transferred aseptically to large vessels or tanks. The medium in which the vegetative inoculum is produced can be the same as, or different from, that utilized for the production of trans-4-n propyl-L-proline and trans-4-ethyl-L-proline, as long as it is such that a good growth of the microorganism is obtained. The microorganism of the subject invention can also be grown in the media and under the conditions disclosed in U.S. Pat. 3,086,912.

Trans-4-n propyl-L-proline and trans-4-ethyl-L-proline can be recovered by first filtering or centrifuging the fermentation broth to remove the mycelia and undissolved solids, and then subjecting the filtered beer to adsorption on a resin column. Non-ionic (preferred) as well as cationic exchange resins can be used. Both the carboxylic acid sulfonic acid types can be used. [Suitable non-ionic resins include resins comprising a non-ionic macro porous copolymer of styrene crosslinked with divinylbenzene. Non-ionic resins of this type are marketed under the trade names Amberlite XAD-1 and XAD-2, disclosed in U.S. Pat. 3,515,717. Suitable carboxylic acid resins include the polyacrylic acid resins obtained by the copolymerization of acrylic acid and divinylbenzene by the procedure given on page 87 of Kuin, Ion Exchange Resins, 2nd Ed. (1958), John Wiley and Sons, Inc. Carboxylic acid cation exchange resins of this type are marketed under the trade names Amberlite IRC–50 and Zeokarb 226. Suitable sulfonic acid resins include nuclear sulfonated polystyrene resins crosslinked with divinylbenzene obtained by the procedure given on page 84 of Kunin, supra. Sulfonated cation exchange resins of this type are marketed under the trade names Dowex-50, Amberlite IR–120, Nalcite HCR, Chempro C–20, Permutit Q, and Zeokarb 225.]

In the preferred process trans-4-n propyl-L-proline and trans-4-ethyl-L-proline are extracted from filtered fermentation broths with Amberlite XAD-2 non-ionic resin and eluted with 1:1 acetone-water. Course of the elution can be monitored by tlc (thin layer chromatography) as described below, and fractions rich in trans-4-n propyl-L-proline or trans-4-ethyl-L-proline selected, combined, concentrated to an aqueous phase and freeze dried. These crude dried preparations can be used to inhibit lincomycin B formation in a lincomycin fermentation, but, if desired, can be further purified by partition chromatography on Dicalite 4200 with the solvent system methyl ethyl ketone-water, with tlc monitoring. Fractions containing propyl or ethyl prolines as desired are combined and dried, and the dry residues mixed with absolute ethanol for crystallization.

In a recovery process using cation exchange resins, the propyl and ethyl prolines are absorbed from the filtered fermentation beers or other aqueous solutions with cation resins such as Dowex 50-X12 (Dow Chemical Co., Midland, Mich.) and eluted with a basic solution such as 50% ammonium hydroxide at a pH of about 11, with tlc monitoring. Selected eluate fractions can be further purified, if desired, by Dicalite chromatography and crystallization as above.

Trans-4-n propyl-L-proline and trans-4-ethyl-L-proline can be detected, e.g. in column eluates, by tlc as follows: 10 x 20 cm. plates are prepared from silica gel $HF_{254}$ (Merck A.G., Darmstadt). Solutions to be examined are concentrated to dryness under $N_2$, dissolved in minimal methanol, and spotted. The plates are irrigated with 75:25 mixture of 95% ethanol-water, dried, and sprayed with ninhydrin as for amino acids. Standard spots containing known amounts of trans-4-n propyl-L-proline or trans-4-ethyl-L-proline are used for comparison and permit judging concentrations in the unknowns.

Alternatively, trans-4-n propyl-L-proline and trans-4-ethyl-L-proline may be assayed by vpc (vapor phase chromatography). To a dry sample containing about 5 mg. of total prolines, one ml. of internal standard solution (1 ml. of hexadecane in 200 ml. pyridine) and 1 ml. of N,O-bistrimethylsilylacetamide solution (Pierce Chemical Co., Rockford, Ill.) is added and allowed to stand with occasional shaking for 30 minutes at room temperature. Silylation is complete when the sample is dissolved completely, and the silylated compounds are stable for at least 24 hours. The silylated mixture is chromatographed in an F and M Model 402 gas chromatograph with flame ionization detector, with use of a 6 ft. by 3 mm. ID glass column packed with 37% OV–1 on 100–120 mesh Gas Chrom Q, according to the art, with oven temperature of 110°, flash heater off, and detector 140°. Reference standards are run for calibration. Vpc analyses tend to be most reliable on relatively purified solutions.

It is to be understood that the process of the subject invention, though described in detail with particular reference to the novel microorganism *Streptomyces lincolnensis* strain BAB–3, NRRL 5321, is not limited to this particular microorganism or to microorganisms fully described by the cultural characteristics disclosed herein. It is intended that the invention also include other strains or mutants of the said microorganism which can be produced by procedures well known in the art, for example by subjecting the novel microorganism to X-ray or ultraviolet radiation, nitrogen mustard, phage exposure, and the like. Hereinafter are described non-limiting examples of the process of the invention. All percentages are by weight and all solvent mixture portions are by volume unless otherwise noted.

Example 1

A soil slant of *Streptomyces lincolnensis* strain BAB–3, NRRL 5321, is used to inoculate a series of 500 ml. Erlenmeyer flasks each containing 100 ml. of seed medium consisting of the following ingredients:

| | Gms. |
|---|---|
| Yeastolac* | 10 |
| Glucose monohydrate | 10 |
| NZ-Amine B** | 5 |
| Tap water, Q.s. 1 l. | |

*Yeastolac is a protein hydroysate of yeast cells sold by A. E. Staley Manufacturing Co., Decatur, Ill.
**NZ-Amine B is Sheffield's enzymatic digest of casein.

The seed medium presterilization pH is adjusted to 7.3. The seed is grown for 2 days at 28° C. on a Gump rotary shaker operating at 250 r.p.m.

A 5% inoculum of the seed described above (5 ml.) is added to each of a series of 500 ml. Erlenmeyer flasks each containing 100 ml. of the following fermentation medium:

| | |
|---|---|
| Black strap molasses | gms./l 60 |
| Hi-starch* | gms./l 60 |
| Pharmamedia** | gms./l 25 |
| $CaCO_3$ | gms./l 6 |
| $K_2SO_4$ (industrial grade) | gms./l 2 |
| Ucon*** | ml./l 1 |
| Tap water, Q.s. balance. | |

\*A whole corn flour produced by Illinois Cereal Mills, Inc., Paris, Ill.
\*\*An industrial grade of cottonseed flour produced by Trader's Oil Mill Company, Fort Worth, Tex.
\*\*\*A polyalkylene glycol synthetic antifoamer supplied by Union Carbide Corp., Chemicals Division, 10421 W. 7 Mile Road, Detroit, Mich., 48221.

The flasks are grown for 7 to 11 days on a Gump rotary shaker at 28° C. and at 250 r.p.m.

Example 2

Whole beer from a BAB-3 fermentation as described above is adjusted to pH 6 and filtered with addition of filter aid. The filter cake is washed with about one-tenth volume of water and the washings are combined with the clear filtrate. The combined clear beer is passed through a column of Amberlite XAD-2 resin (0.33 liter of resin per liter of clear beer) at a flow rate of 0.5 resin volumes per hour, and the column is blown with air but not washed. The blown column is eluted with 1:1 acetone-water at the above flow rate, with tlc monitoring. By this procedure, 10 l. of whole beer from a BAB-3 tank fermentation yielded a spent beer containing only a trace of propyl proline, but the freeze-dried eluate (84.2 g.) was rich in it.

The above freeze-dried concentrate of propyl proline is chromatographed in a Dicalite 4200 column, using 40 g. Dicalite per gram of dry concentrate. A mixture of 10:2 (by volume) methyl ethyl ketone:water is prepared and separated into its two phases. The column bed is prepared by mixing Dicalite with enough upper phase to provide flow after the lower phase is added, then mixed with lower phase (about 0.4 ml. per gram Dicalite) packed, and drained. The load is prepared by dissolving freeze-dried concentrate in lower phase (1 g./3 ml.), mixed with Dicalite (2 g./ml. of lower phase used for dissolution of the load) and sufficient upper phase to flow, poured carefully on the column bed, and drained. The column is developed with fresh upper phase at a flow rate of about 400 ml./hr./kg. bed Dicalite. Fractions of about 1 l. for each 2 kg. bed Dicalite are taken and monitored by tlc. Selected fractions (in this case those rich in trans-4-n propyl-L-proline) are concentrated to aqueous and freeze-dried.

The resulting purified concentrate is suspended in a minimal volume of absolute ethanol and the solids are washed with minimal absolute ethanol. The washed crystals are recrystallized, with heating, from absolute ethanol.

Trans-4-n propyl-L-proline characterization

| | |
|---|---|
| Color | White. |
| Carbon | 60.85%. |
| Hydrogen | 9.44%. |
| Nitrogen | 8.69%. |
| Empirical formula | $C_8H_{15}NO_2$. |
| $[\alpha]_D^{25}$ ($H_2O$) | −51. |
| $[\alpha]_D^{25}$ (5NHCl) | −28. |
| Melting point | 226.3–227.0° C. |
| UV ($H_2O$) | No maxima at 200–400 m$\mu$. |
| Mass spec.: | |
| M+ | 157. |
| 112 | M+—$CO_2H$. |
| Fragment ions | 69: M+—$CO_2H$—$C_2H_7$. |
| Titration | Not amenable to titration. |

Example 3

By following the procedures of Example 2 but selecting and processing further the column fractions rich in trans-4-ethyl-L-proline as determined by assay procedures described herein, purified trans-4-ethyl-L-proline is afforded.

We claim:

1. A microbiological process for preparing amino acids selected from the group consisting of trans-4-n propyl-L-proline and trans-4-ethyl-L-proline which comprises cultivating Streptomyces lincolnensis strain BAB-3, having the identifying characteristics of NRRL 5321, and mutants thereof, in an aqueous nutrient medium under aerobic conditions.

2. A process, according to claim 1, wherein said aqueous nutrient medium contains a source of assimilable carbohydrate and assimilable nitrogen.

3. A process, according to claim 1, wherein said trans-4-n propyl-L-proline and trans-4-ethyl-L-proline are isolated from the fermentation broth.

4. A microbiological process for preparing trans-4-n propyl - L - proline which comprises cultivating Streptomyces lincolnensis strain BAB-3, having the identifying characteristics of NRRL 5321, and mutants thereof, in an aqueous nutrient medium under aerobic conditions.

5. A process, according to claim 4, wherein said trans-4-n propyl-L-proline is isolated from the fermentation broth.

6. A microbiological process for preparing trans-4-ethyl-L-proline which comprises cultivating Streptomyces lincolnensis strain BAB-3, having the identifying characteristics of NRRL 5321, and mutants thereof, in an aqueous nutrient medium under aerobic conditions.

7. A process, according to claim 6, wherein said trans-4-ethyl-L-proline is isolated from the fermentation broth.

References Cited

UNITED STATES PATENTS 3,650,899    3/1972    Noguchi et al.  _____ 195—29

OTHER REFERENCES

Chemical Abstracts; vol. 64, 11304; 1966.

A. LOUIS MONACELL, Primary Examiner

R. J. WARDEN, Assistant Examiner

U.S. Cl. X.R.

195—29